United States Patent [19]

Holzschuh

[11] 4,201,533
[45] May 6, 1980

[54] MOLD CLOSING AND LOCKING DEVICE

[75] Inventor: Johann Holzschuh, Meinerzhagen, Fed. Rep. of Germany

[73] Assignee: Battenfeld Maschinenfabriken, Meinerzhagen, Fed. Rep. of Germany

[21] Appl. No.: 968,690

[22] Filed: Dec. 12, 1978

[30] Foreign Application Priority Data

Dec. 20, 1977 [DE] Fed. Rep. of Germany ....... 2756717

[51] Int. Cl.$^2$ .............................................. B29F 1/06
[52] U.S. Cl. ................................. 425/451.9; 425/590
[58] Field of Search ............... 425/450.1, 451.6, 451.9, 425/DIG. 221, 592, 590, 595

[56] References Cited

U.S. PATENT DOCUMENTS

| | | | |
|---|---|---|---|
| 3,687,590 | 8/1972 | Cyriax | 425/594 X |
| 3,737,278 | 6/1973 | Putzler | 425/590 |

FOREIGN PATENT DOCUMENTS

| | | | |
|---|---|---|---|
| 1127069 | 4/1962 | Fed. Rep. of Germany | 425/DIG. 221 |
| 1147301 | 6/1957 | France | 425/DIG. 221 |

Primary Examiner—J. Howard Flint, Jr.

Attorney, Agent, or Firm—Thompson, Birch, Gauthier & Samuels

[57] ABSTRACT

A mold closing and locking device is disclosed, including a fixed mold carrier plate, a stationary end plate, a movable mold carrier plate displaceable between the fixed mold carrier plate and the stationary end plate on support shafts through the action of a piston-cylinder unit, an adjustable distance-determining member extending between the piston-cylinder unit and the movable mold carrier plate, a pressure plate carried on a swivel arm for movement into and out of engagement between said piston-cylinder unit and said distance determining member, with the swivel arm being attached to a pivot bearing mounted on one of the aforesaid support shafts, with the pressure plate having a limited displacement range against spring tension in a direction parallel to the movement of the movable mold carrier plate, and with the swivel arm being movable by means of a pressurized pivot drive supported on another of the support shafts. The aforesaid spring tension is provided by a spring supported at the end plate and connected to the swivel arm by means of a flexible tension member which acts proximate the pivot bearing. The pivot bearing is axially displaceable along its support shaft. The pressure plate is flat and rigidly attached to the free end of the swivel arm.

6 Claims, 2 Drawing Figures

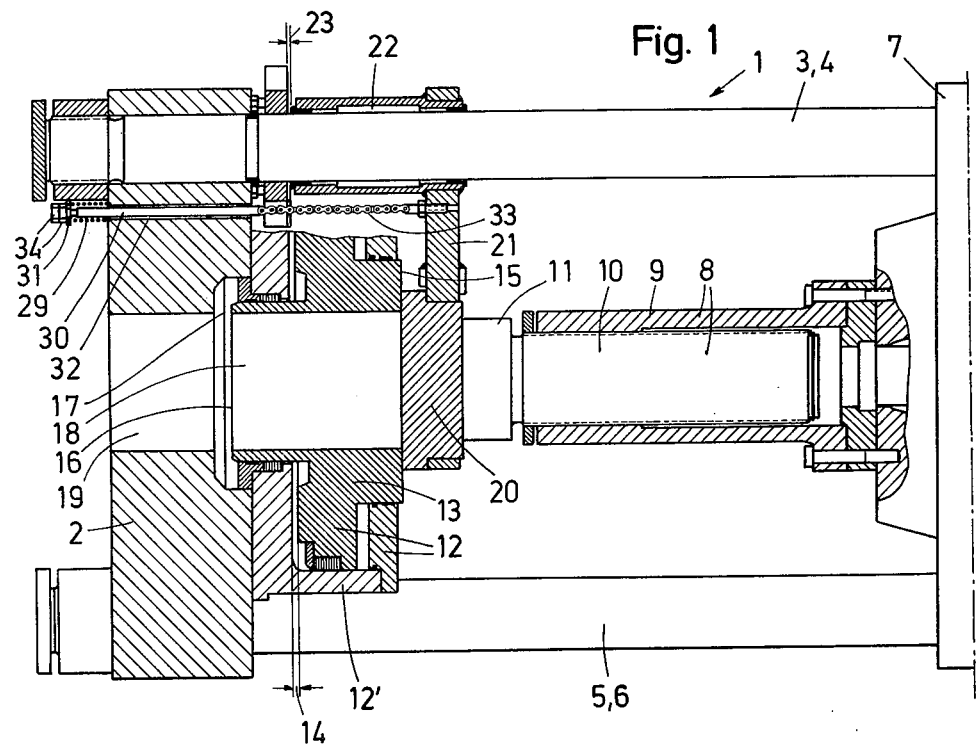
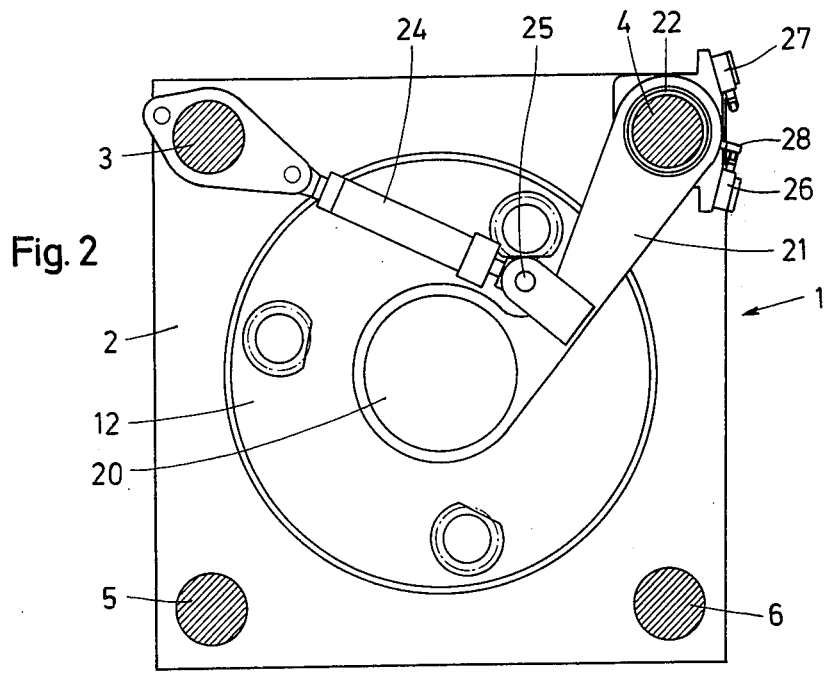

MOLD CLOSING AND LOCKING DEVICE

BACKGROUND OF THE INVENTION

A. Field of Invention

The present invention relates generally to a device for closing and locking two portions of a mold in diecasting or injection molding machines. More specifically, the invention relates to a mold closing device of the type that includes a fixed mold carrier plate, a fixed end plate, and a movable mold carrier plate that can be displaced from an open to a closed position between the fixed mold carrier plate and the fixed end plate through the use of a piston-cylinder unit that acts on the movable mold carrier plate.

In addition, the invention generally relates to an improvement in mold closing devices of the described type that also include a pressure plate to lock the two parts of the mold together. The pressure plate is carried on a swivel arm that is rotably mounted on one of the shafts that support the fixed mold carrier plate; it may alternately be moved between and from between the piston-cylinder unit and the movable mold carrier plate.

In the present invention, the swivel arm and its pivot bearing are carried on a shaft in such a way that the pressure plate has a limited displacement range against a spring tension. That displacement range is shorter than the stroke of the piston in its cylinder. The swivel arm is pivoted against a pressurized cylinder that is supported from a neighboring shaft. For spanning the distance between the movable mold carrier plate and the piston-cylinder unit, a gradually adjustable longitudinal distance-determining member is provided.

B. Description of the Prior Art

Mold closing devices of the general type described here are known in the prior art. See for example, German Pat. Nos. 11 27 069 and 21 09 957 (hereafter the No., '069 and No. '957 patents). For example, the inward and outward pivoting of the pressure plate in the mold closing device of the No. '069 patent is established in a relatively simple way: the pivot bearing of the swivel arm is immovably located on one of the shafts and the pressure plate is rigidly attached to the free end of the swivel arm.

This arrangement, however, has several disadvantages. For example, the faultless inward and outward pivoting of the pressure plate is not reliably assured. The swivel arm remains in a fixed position on the shaft and the pressure plate hangs in unbalanced suspension on the swivel arm. To open the mold, the pressure on the piston is released so that it returns to its initial unengaged position. During this process, firm contact between the pressure plate and the movable carrier plate ceases and a gap appears between the piston and the pressure plate held by the swivel arm. When the pressure plate is swung out of this position, it glides along the movable mold carrier plate; however, when the pressure plate is subsequently swung inwards, it may strike the movable mold carrier plate in an undesirable way. Jamming may occur and the pressure plate and the movable mold carrier plate may be damaged. This disadvantage arises because the displacable swivel arm does not exactly retain the same orientation throughout its outward swing and because the swivel arm may become somewhat twisted on its shaft from the unbalanced suspension of the pressure plate from its pivot bearing. This disadvantage can be eliminated if a more uniform weight distribution is achieved. However, in such an arrangement there may still arise a small deflection of the shaft that carries the swivel arm in the region between the end plate and the movable mold carrier plate.

Another disadvantage of the prior art mold closing and locking devices of the type described here arises from the twisting of the pivot bearing on its shaft that may occur with the displacement of the swivel arm carrying the pressure plate when the piston is activated. This situation may result in damage to the bearing faces and thereby a loosening of the bearing so that accurate preservation of the pressure plate perpendicular to the shaft is not reliably insured. Extended use might cause the swivel plane to shift obliquely with respect to the plane of the movable mold carrier plate, thereby impairing the operating ability of the entire mold closing device.

The disadvantages of the No. '067 mold closing device have been avoided in large measure in the No. '598 mold closing device, but the improved operating reliability of the latter device has been purchased with substantially higher manufacturing costs.

SUMMARY OF THE INVENTION

Accordingly, a principal object of the present invention is the elimination of the disadvantages peculiar to the prior art mold closing devices of the described type.

It is also an object of the present invention to achieve reliable parallel plane contact between an engaged piston and a pressure plate, thereby eliminating twisting of the pressure plate's pivot bearing on its shaft.

It is a further object of the invention to provide a pivot bearing that is axially shiftable only through the application of forces near the bearing itself.

It is yet another object of the present invention to provide a relatively flat pressure plate.

It is still another object of the present invention to provide a pressure plate whose longitudinal axis when disengaged remains parallel to the axis of the shaft that supports its pivot bearing.

It is also an object of the present invention to provide a pressure plate that is exposed only to axially effective forces.

It is a further object of the present invention to provide a gradually adjustable distance-determining member that is not carried by the swivel arm with the result that unbalanced suspended loads in the swivel arm and their consequent deleterious effects on the pivot bearing are eliminated.

It is yet another object of the present invention to provide a gradually adjustable distance determing member that may be received within the center bore of an annular piston for removal of a mold part when the pressure plate is disengaged.

It is still another object of the present invention to provide a swivel arm that is not subject to twisting forces when the piston is disengaged and whose pivot bearing also is not subject to twisting forces when the piston is engaged.

It is also an object of the present invention to provide a swivel arm with a favorable weight distribution and load, thereby eliminating deflection in the shafts that hold the swivel arm's pivot bearings.

It is a further object of the present invention to locate the swivel arm at the optimal place on its pivot bearing.

It is yet another object of the present invention to provide a swivel arm whose angle of traverse between positions of engagement and disengagement is of the order of 45° or less (as compared to the 90° common in the prior art).

It is still another object of the present invention to provide a pivot drive with a relatively short stroke compared to the pivot art so as better to control twisting in the swivel arm and deflection in the pivot bearing shaft.

It is also another object of the present invention to provide for the reliable formation of an effective gap between the piston and the movable mold carrier plate so as to facilitate the reliable inward and outward pivoting motions of the pressure plate.

It is a further object of the present invention to provide a mold locking device which is relatively inexpensive to build and which nevertheless operates reliably over an extended period of time.

It is yet another object of the present invention to provide a mold locking device that is easily repairable and maintainable.

BRIEF DESCRIPTION OF THE DRAWINGS

The drawings show the portions of a mold closing device of the described type that are essential for understanding the present invention.

FIG. 1 shows the mold closing and locking device of the present invention in a side elevational and partly in a sectional view.

FIG. 2 is a front view of the pressure plate of the mold closing and locking device of the present invention shown supported on its swivel arm and operating in conjunction with a pressurized pivot drive, all viewed from the perspective of one looking toward the stationary end plate of FIG. 1.

DESCRIPTION OF THE PREFERRED EMBODIMENT

FIG. 1 shows a mold closing device according to the present invention which includes a stationary end plate 2 mounted on the end of four shafts 3,4,5,6. Mounted on the other end of each of these four shafts 3,4,5,6 is a fixed mold carrier plate (not shown). Between the fixed mold carrier plate and the stationary end plate 2, a movable mold carrier plate 7 is supported on the four shafts 3,4,5,6. At one end of movable mold carrier plate 7, a gradually adjustable longitudinal distance determining member 8 is provided. Such member 8 consists of a threaded sleeve 9 with an adjustable threaded bolt 10 therein. Threaded bolt 10 has a collar 11.

Mounted on one side of the stationary end plate 2 is a piston-cylinder unit 12 which includes a housing 12' that contains a pressurized cylinder and a piston 13 displacable therein through a relatively short stroke 14. One end 15 of piston 13 projects from housing 12' in the direction of distance determining member 8. Its other end 16 also extends from housing 12' and is enclosed by a recess 17 in end plate 2. Piston 13 has a center bore 18 and thus an annular shape. Coaxially with center bore 18 of piston 13, end plate 2 is provided with a bore 19. The diameter of the two bores 18, 19 is larger than the diameter of distance determining member 8 and, accordingly, distance determining member 8 may enter bores 18, 19 unimpeded when movable mold carrier plate 7 is shifted toward stationary end plate 2 to open the mold. To enable piston-cylinder unit 12 to apply the required locking force to the already closed mold through movable mold carrier plate 7, a pressure plate 20 is introduced between the end of distance determining member 8 (that is at collar 11 of threaded bold 10) and the free end 15 of piston 13. Pressure plate 20 is carried at the free end of swivel arm 21 whose other end is connected with pivot bearing 22. Pivot bearing 22 is mounted on shaft 4 in such a way that it can rotate thereon in a limited way. Pivot bearing 22 is also axially displacable along shaft 4 through a small distance 23. The axial displacement distance 23 of pivot bearing 22 is smaller than the stroke displacement distance 14 of piston 13 in piston-cylinder unit 12.

FIG. 2 illustrates swivel arm 21 carring pressure plate 20. Swivel arm 21 is suspended from pivot bearing 22 on shaft 4 in such a way that pressure plate 20 lies considerably lower than the shaft 4 that supports swivel arm 21 for all pivoting positions of swivel arm 21. Swivel arm 21 traverses an angle of approximately 45° from the highest point of the swivel path at the inwardly pivoted position of pressure plate 20 to the lowest point of the swivel path at the outward pivoted position of pressure plate 20. At its inwardly pivoted position, pressure plate 20 lies between piston 13 and collar 11 of distance determining member 8. At its outwardly pivoted position, pressure plate 20 has its vertical axis lying vertically beneath the longitudinal axis of shaft 4.

A piston drive for swivel arm 21 is provided. Such piston drive 24 is typically a pressurized cylinder, one end of which is suspended from shaft 3 and the other end of which engages swivel arm 21 in the proximity of pressure plate 20 through a bearing block 25. Since pressure plate 20 is always suspended from swivel arm 21, it is possible to construct pivot drive 24 with a relatively short stroke and with relatively low pressures compared to the devices used in the prior art. The function of piston drive 24 is to pivotally manipulate the swivel arm 21 with pressure plate 20. Swivel arm 21 rests automatically in its outwardly pivoted position by its own weight; hence the pressure in pivot drive 24 may be released when swivel arm 21 is in such position. The pressure regulation of pressurized cylinder 24 is accomplished by two limit switches 26, 27, which are actuated through the movements of cam 28 connected to swivel arm 21. Thus, when swivel arm 21 has reached its inwardly pivoted position, cam 28 actuates limit switch 26, thereby interrupting the pressurized supply to cylinder 24 and simultaneously blocking the back flow of pressurized supply from cylinder 24. In the outwardly pivoted position of swivel arm 21, cam 28 activates limit switch 27. This interrupts the pressurized supply to cylinder 24, but here there is no need to prevent the backflow of the pressurized supply from the cylinder because swivel arm 21 remains in its outwardly pivoted position by its own weight.

Before pressure plate 20 can be brought from its inwardly pivoted position to its outwardly pivoted position, it is necessary to retract piston 13 of piston-cylinder unit 12 through the distance 14 so that pressure plate 20 may be released from contact with the frontal area of piston 13. Further, to free it from contact with collar 11 of distance determining member 8, pressure plate 20 must be shifted in the direction of stationary end plate 2 through the displacement distance 23 by movement of swivel arm 21. The shifting of swivel arm 21 through displacement distance 23 is accomplished by means of a compression spring 29 which is supported at the outside face of stationary end plate 2. A pull rod 30 is passed through compression spring 29 and rests in a bracket 31 at the free end of compression spring 29. Pull rod 30 passes through a bore 32 in end plate 2 in such a way that it can move within bore 32 only axially. At its other end, pull rod 30 engages a flexible tension member 33, typically a chain, which in turn is connected with swivel arm 21 near pivot bearing 22. Through adjusting nut 34, the displacement force of compression spring 29 can be regulated in such a way that compression spring 29 moves swivel arm 21 automatically through displacement distance 23 in a direction toward stationary end plate 2 as soon as piston 13 of piston-cylinder unit 12 has been retracted through distance 14 into its housing 12'. Since compression spring 29 engages swivel arm 21 in the proximity of pivot bearing 22 by means of a flexible tension member 33, swivel arm 21 is free to move unimpeded by spring 29 between its inwardly and outwardly pivoted positions. To provide flexible tension member 33 with a dimension that will in no way impede the pivoting motion of swivel arm 21, it is useful to attach swivel arm 21 at that end of pivot bearing 22 that is facing away from stationary end plate 2, as is clearly evident from FIG. 1. Testing has shown that the suspended arrangement of swivel arm 22 from shaft 4 in connection with the special spring arrangement just described insures under all operating conditions of the mold closing and locking device the free motion of swivel arm 21 without the production of any twisting forces.

Thus, the spring tension has its support at stationary end plate 2 and acts through a flexible tension member 33 on pivot bearing 22 proximate the location of swivel arm 21 on pivot bearing 22. Pressure plate 20, typically a flat plate, is rigidly attached to the free end of swivel arm 21. Pivot bearing 22 rotates on shaft 4 and is also axially shiftable along said shaft 4. For this reason, no noteworthy twisting forces arise on pivot bearing 22. When piston 13 is released, the spring tension which causes the formation of a gap between pressure plate 20 and movable mold carrier plate 7 is applied in close proximity to pivot bearing 22 and cannot therefore generate any twisting forces on swivel arm 21. If piston 13 is activated in order to close and lock the mold, then likewise no twisting forces become effective at pivot bearing 22 because the spring tension that is opposed to the action of piston 13 is not effective on pressure plate 20 or swivel arm 21 but between pivot bearing 22 and stationary end plate 2. Thus, the forces exerted on swivel arm 21 always insure parallel plane contact between piston 13 and pressure plate 20. The spring arrangement just described is also particularly favorable because its components are such that they are at all time easily acessible and therefore easily exchangeable if required. In addition, the spring tension is readily adjustable with respect to whatever forces might be required.

What is claimed is:

1. In combination with a mold closing and locking device including a fixed mold carrier plate, a stationary end plate, a movable mold carrier plate displaceable between the fixed mold carrier plate and the stationary end plate on support shafts through the action of a piston-cylinder unit, an adjustable distance-determining member extending between the piston-cylinder unit and the movable mold carrier plate, a pressure plate carried on a swivel arm for movement into and out of engagement between said piston-cylinder unit and said distance determining member, with the swivel arm being attached to a pivot bearing mounted on one of the aforesaid support shafts, with the pressure plate having a limited displacement range against spring tension means in a direction parallel to the movement of the movable mold carrier plate, and with the said swivel arm being movable by means of a pressurized pivot drive supported on another of the support shafts, the improvement comprising: said spring tension means being supported at said end plate and being connected to said swivel arm by means of a flexible tension member which acts proximate said pivot bearing, said pivot bearing being axially displaceable along its support shaft, said pressure plate being flat and rigidly attached to the free end of said swivel arm.

2. The mold closing and locking device of claim 1, wherein said spring tension means includes a compression spring supported on the outside face of said end plate, said flexible tension member being connected to a pull rod which passes through said end plate and said compression spring.

3. The mold closing and locking device of claim 1, wherein said pressure plate projects beyond said swivel arm in the direction toward said piston-cylinder unit, wherein said distance-determining member is connected with said movable mold carrier plate, and wherein said piston has an annular shape with a center bore adapted to receive said distance-determining member when said pressure plate does not lie between said piston-cylinder unit and said distance-determining member.

4. The mold closing and locking device of claim 1, wherein said swivel arm is suspended from said pivot bearing in such a way that the angle of traverse between the engaged and disengaged positions of said pressure plate is no more than 45° and wherein said pivot drive engages said swivel arm proximate said pressure plate.

5. The mold closing and locking device of claim 1, wherein the vertical axis of said pressure plate in its fully disengaged position is substantially perpendicular to the longitudinal axis of said shaft that supports said swivel arm.

6. The mold closing and locking device of claim 1, wherein said swivel arm is attached to said pivot bearing at the end of said swivel bearing that faces away from said end plate.

* * * * *